US012122180B2

(12) United States Patent
Chan et al.

(10) Patent No.: US 12,122,180 B2
(45) Date of Patent: Oct. 22, 2024

(54) WRITING SYSTEM HAVING MAGNETIC WRITING TOOL AND MAGNETIC SUPPORT SURFACE THEREFOR

(71) Applicant: SteadyScrib, LLC, Evanston, IL (US)

(72) Inventors: Alexis Anne Chan, Evanston, IL (US); Isabelle Mokotoff, Evanston, IL (US)

(73) Assignee: SteadyScrib, LLC, Evanston, IL (US)

( * ) Notice: Subject to any disclaimer, the term of this patent is extended or adjusted under 35 U.S.C. 154(b) by 0 days.

(21) Appl. No.: 18/363,196

(22) Filed: Aug. 1, 2023

(65) Prior Publication Data

US 2024/0042791 A1 Feb. 8, 2024

Related U.S. Application Data

(60) Provisional application No. 63/394,736, filed on Aug. 3, 2022.

(51) Int. Cl.

*B43K 24/08* (2006.01)
*B43K 5/00* (2006.01)
*B43K 7/00* (2006.01)
*B43K 8/00* (2006.01)
*B43K 23/004* (2006.01)

(52) U.S. Cl.

CPC ............ *B43K 24/088* (2013.01); *B43K 7/005* (2013.01); *B43K 5/005* (2013.01); *B43K 8/003* (2013.01); *B43K 23/004* (2013.01)

(58) Field of Classification Search

CPC ...... B43K 5/005; B43K 8/003; B43K 23/004; B43K 29/00; B43K 24/088; B43K 7/005
USPC ....................................... 401/52, 95, 131, 48
See application file for complete search history.

(56) References Cited

U.S. PATENT DOCUMENTS 3,583,820 A * 6/1971 Koeln ...................... B43K 7/12 401/107
4,643,604 A * 2/1987 Enrico .................. B43K 29/00 211/DIG. 1
4,865,285 A * 9/1989 Gaggianese ......... B43M 99/004 211/DIG. 1
5,876,134 A * 3/1999 Tseng .................. B43K 23/004 30/526
2005/0074274 A1* 4/2005 Furukawa ............ B29C 66/731 401/222
2009/0035050 A1* 2/2009 Ramos .................. B43K 23/04 248/346.03
2010/0322698 A1* 12/2010 Martin .................. B43K 7/005 401/131

* cited by examiner

*Primary Examiner* — David J Walczak
(74) *Attorney, Agent, or Firm* — Flener IP & Business Law; Zareefa B. Flener

(57) ABSTRACT

A writing system comprises a writing tool comprising a barrel having a first end and a second end, a medium holder having a first end and a second end, the medium holder disposed within the barrel, wherein the medium holder is adapted to support a medium applicator to protrude from the first end of the barrel, and a magnetic core disposed within the barrel proximate to the first end of the barrel.

12 Claims, 9 Drawing Sheets

WRITING SYSTEM HAVING MAGNETIC WRITING TOOL AND MAGNETIC SUPPORT SURFACE THEREFOR

CROSS-REFERENCE TO RELATED APPLICATIONS

The present application claims priority to U.S. Provisional Patent Application Ser. No. 63/394,736, filed on Aug. 3, 2022, and incorporated by reference in its entirety herein.

FIELD OF THE INVENTION

The present invention relates to a writing system including a magnetic writing tool and a magnetic support surface therefor. In particular the present invention relates to a magnetic writing tool usable with a magnetic support surface, for example, to enable writing activities, including writing or drawing, for example, for people with lost, impaired, or undeveloped fine motor skills.

BACKGROUND

People with fine motor deficiencies or disabilities experience an impairment, or even an inability, to perform certain tasks, specifically those that necessitate significant manual dexterity. Writing functions are one such category of tasks constrained by a deficiency or disability in fine motor skills. People with Parkinson's disease, for example, most likely experience at least one, if not all, of the following writing-inhibitive symptoms due to a fine motor disability: tremors, bradykinesia, and rigidity. Moreover, people with other general aging-associated diseases like arthritis, Huntington's disease, and multiple system atrophy similarly struggle with fine motor disabilities and, thus, similar writing-inhibitive symptoms. Aside from people with general aging-associated diseases, young children with general developmental deficiencies or specific disabilities, such as dysgraphia, also experience impairment or inability to perform writing functions due to poor fine motor skills.

Just as their counterparts with sufficient fine motor skills, people with fine motor deficiencies and disabilities desire to complete writing functions autonomously. Because people with writing-inhibitive symptoms or conditions lack writing utensils compatible with their manual dexterity, they cannot perform exemplary writing activities that a person loves or needs to do to lead a functional and rewarding life, for example without limitation, drawing, taking notes, completing academic or work-related assignments and tasks, journaling, signing receipts, completing medical and legal forms, and so much more.

A need therefore exists for a writing system that allows a person with writing-inhibitive symptoms or conditions to perform the above-noted exemplary writing activities. It would be beneficial if such a writing system helped to counteract the main writing-inhibitive Parkinson's symptoms, thereby stabilizing drawing and handwriting processes. It would be beneficial if such a writing system counteracted the tremors, manual rigidity, and bradykinesia associated with Parkinson's disease. It would be further beneficial if the writing system included a writing tool that was sleek and had a minimalist design that is intuitive to use and easy to hold.

BRIEF SUMMARY OF THE INVENTION

In one aspect of the invention, a writing system comprises a writing tool comprising a barrel having a first end and a second end, a medium holder having a first end and a second end, the medium holder disposed within the barrel, wherein the medium holder is adapted to support a medium applicator to protrude from the first end of the barrel, and a magnetic core disposed within the barrel proximate to the first end of the barrel.

In another aspect of the invention, a writing system comprises a writing tool comprising a barrel having a first end and a second end, a core sleeve disposed within the barrel and having a first end and a second end, a medium holder having a first end and a second end, the medium holder disposed through the core sleeve, wherein the first end of the medium holder supports a medium applicator, and a magnetic core disposed within the barrel proximate to the first end of the barrel.

In a further aspect of the invention, a writing system comprises a writing tool comprising a barrel having a first end and a second end, a core sleeve disposed within the barrel and having a first end and a second end, and a magnetic core disposed within the barrel proximate to the first end of the barrel. A medium holder is disposed within the barrel between the first end of the core sleeve and the magnetic core, wherein the medium holder is adapted to support a solid medium to protrude from the first end of the barrel. A spring is disposed around the medium holder so that first and second ends of the medium holder are biased apart by the spring. An advancement button is disposed extending from the second end of the barrel and adapted to have a longitudinal motion relative to the barrel.

DETAILED DESCRIPTION

The following detailed embodiments presented herein are for illustrative purposes. That is, these detailed embodiments are intended to be exemplary of the present invention for the purposes of providing and aiding a person skilled in the pertinent art to readily understand how to make and use the present invention. While certain shapes and materials are used in some embodiments, they are by no means an intention of restriction.

Various embodiments described herein are meant to enable patients with writing-inhibitive symptoms or conditions, including any disability or deficiency in fine motor skills, to write independently with effectiveness and efficiency. In an embodiment of a writing system, Parkinsonian writing-inhibitive symptoms, for example tremors, are specifically counteracted by a writing system utilizing a magnetic attraction between a writing tool and a writing surface. The force of the magnetic attraction produces an effect that feels akin to additional weight being added to the writing tool, thereby facilitating intentional and stabilized manual fine motor movements. Keeping the writing tool 100, 200, 300 and specifically, the medium applicator 106, 206, 306 or the solid writing medium 298 steady on or directly above the magnetic support surface 120, counteracts any writing-inhibitive movements such as those caused by tremors or bradykinesia and facilitates intentional and stabilized manual fine motor movements.

It is envisioned that the technology of the current disclosure is applicable to writing-inhibitive conditions and symptoms beyond those of Parkinson's disease, for example, the technology of the current disclosure could be slightly altered for the purpose of counteracting writing-inhibitive symptoms and facilitating intentional, stabilized manual fine motor movements for other specific conditions or life stages that result in poor fine motor skills.

Figure 1:
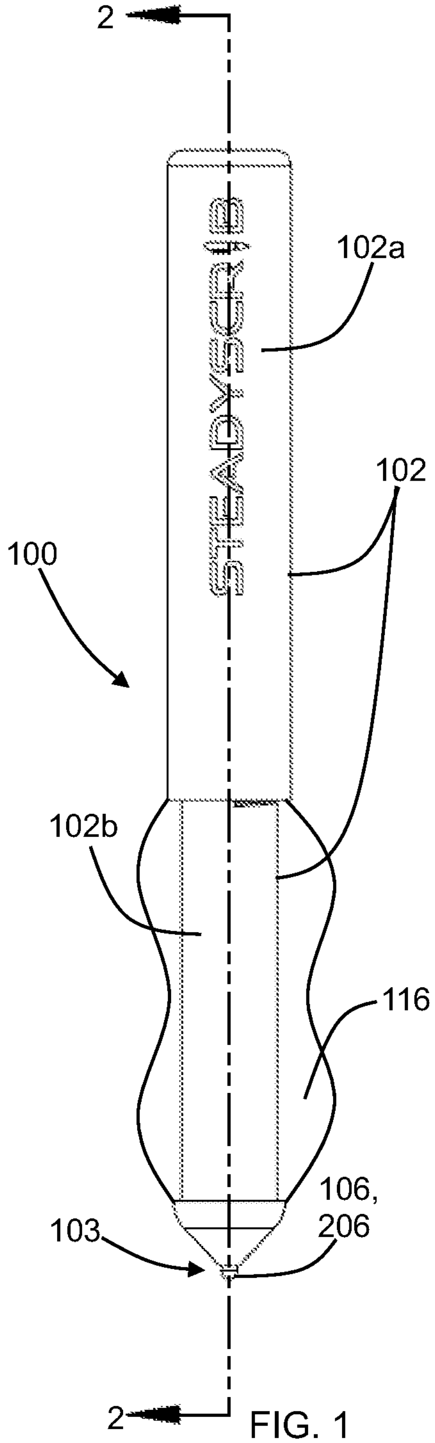
FIG. 1 illustrates a side view of an exemplary writing tool disposed according to an embodiment.
Figure 2:
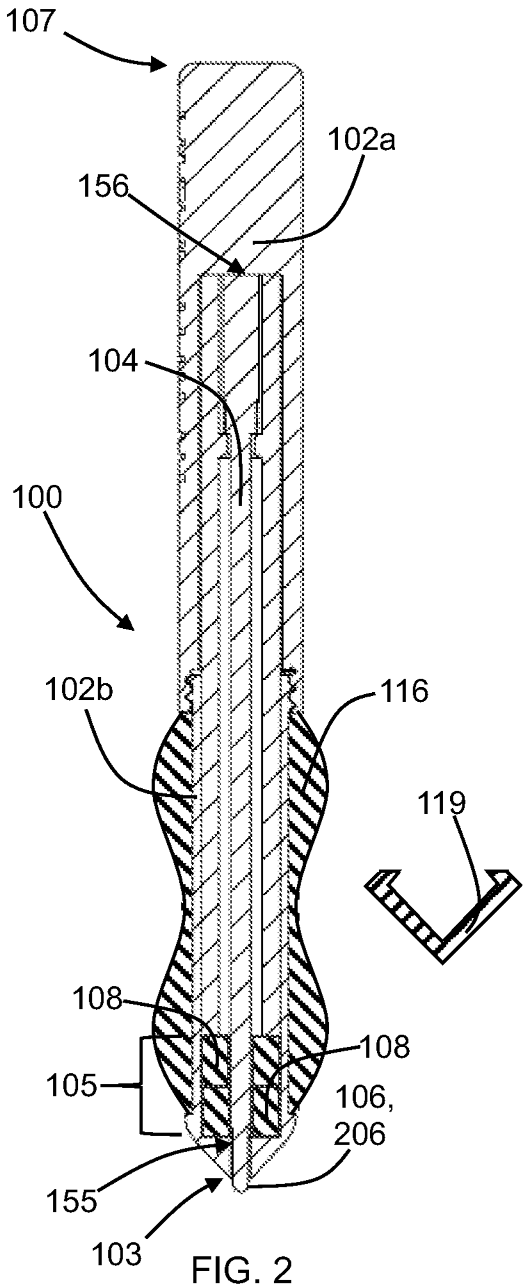
FIG. 2 illustrates a cross-sectional view of the exemplary writing tool of FIG. 1 taken generally along the lines 2-2 of FIG. 1.

Referring to FIGS. 1 and 2, an embodiment of a writing tool 100, for example, a pen 100, comprises a barrel 102 having a first end 103 and a second end 107, a medium holder 104, for example an ink fill 104 (see FIG. 2) disposed within the barrel 102, the medium holder 104 having a first end 155 and a second end 156. In an embodiment the medium holder 104 is adapted to support a medium applicator 106 to protrude from the first end 103 of the barrel 102. For example, in the embodiment shown in FIG. 2, a medium applicator 106 comprises a writing nib 106 disposed at an end of the medium holder 104 and protruding from a first end 103 of the barrel 102.

Referring to FIG. 2, in an embodiment a cap 119 is sized to attach over the first end 103 of the barrel 102 (or any of the first ends 103, 203, 303 of the barrels 102, 202, 302 described herein). In an embodiment the cap 119 protects the first end 103, 203, 303 or the medium applicator 106, 206, 306, or the solid writing medium 298 as described hereinbelow.

In an embodiment a magnetic core 105 is disposed within the barrel 102 proximate to the first end 103 of the barrel 102. In an embodiment the magnetic core 105 comprises at least one magnet 108. In an embodiment the magnetic core 105 comprises two magnets 108. In other embodiments the magnetic core 105 comprises more than two magnets 108. In an embodiment the two magnets 108 are stacked ring neodymium magnets, wherein an end of the stack is positioned about 5 mm above the end 103 of the writing tool 100. As is explained hereinbelow, the magnetic core 105 is what provides a magnetic force of attraction along the medium applicator 106 between the writing tool 100 and a magnetic supporting surface 120 disposed underneath.

Figure 4:
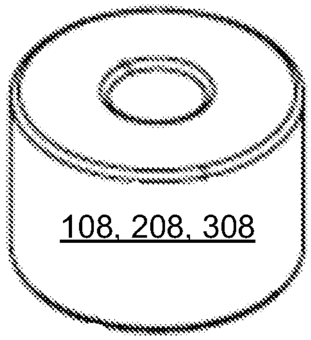
FIG. 4 illustrates a perspective view of a magnet according to an embodiment.

In an embodiment, the magnet or magnets 108 are generally cylindrical and have a passage disposed therethrough as illustrated in FIG. 4. In an embodiment the magnetic core 105, for example comprising one, or two, or more magnets as illustrated in FIG. 4, is disposed around the medium holder 104. In an embodiment the medium holder 104 is an ink fill 104, and the medium applicator 106 is a ballpoint writing nib 106, which writes like a conventional pen and provides a user a writing experience that is indistinguishable from a conventional pen.

In an embodiment, the writing tool 100 shown in FIGS. 1 and 2 utilizes ink as a writing medium so that the medium holder 104 is an ink fill 104 having a medium applicator 106 that is a writing nib 106. In another embodiment, the writing tool 100 is a marker wherein the medium holder 104 is a reservoir or ink fill 104 for holding the marker ink and the medium applicator 106 is for example, a felt or sponge tip 206 or other tip structure as is known in the art for markers or paint, and wherein a felt body or other structure extends between the felt or sponge tip 206 and the reservoir 104 thereby providing a path for the marker ink to be drawn toward the felt or sponge tip 206, for example by wicking or capillary action. In other embodiments, the medium holder 104 can be any sort of structure that is comprised of or holds a liquid writing medium, for example without limitation, marker ink, conventional ink, paint, or any other liquid writing medium. Similarly, in other embodiments, the medium applicator 106, 206 can be any sort of medium applicator 106, 206 including a writing nib 106, a felt or sponge tip 206 or other tip structure for delivery of a liquid writing medium, that extends from the end 103 of the barrel 102.

Figure 5:
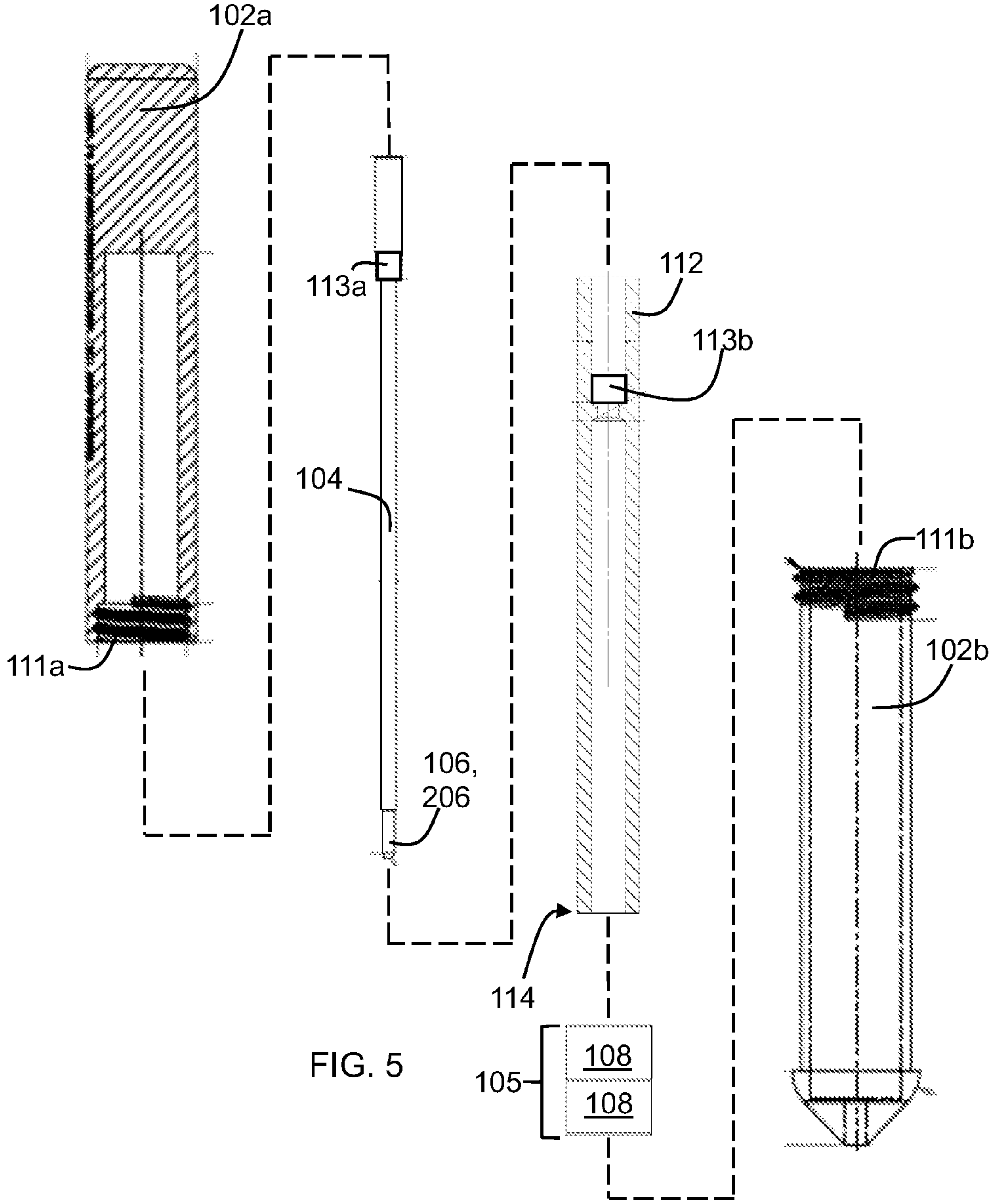
FIG. 5 illustrates an exploded view of the components of an exemplary writing tool according to an embodiment.

Referring to FIGS. 1, 2, and 5, in an embodiment the barrel 102 comprises a first portion 102*a* and a second portion 102*b*, wherein the first and second portions 102*a* and 102*b* detachably attach as further described hereinbelow. Still referring to FIGS. 2 and 5, in an embodiment the writing system 100 further comprises a core sleeve 112 disposed within the barrel 102, wherein the medium holder 104 is disposed through the core sleeve 112. In an embodiment, the medium holder 104 detachably attaches to the core sleeve 112 as further described hereinbelow.

Referring to FIG. 5, in an embodiment the writing tool or pen 100 is assembled by following the connections indicated by the dashed lines between the components illustrated in FIG. 5. In an embodiment the steps include holding the second portion 102*b* of the barrel 102 so that a connecting end is facing up and placing the magnetic core 105 into the second portion 102*b* of the barrel 102. Next, in an embodiment the core sleeve 112 is placed into the second portion 102*b* so that an end 114 of the core sleeve 112 contacts the magnetic core 105.

In an embodiment the medium holder 104 is then placed into the core sleeve 112 until a first connecting region 113*a* on the medium holder 104, for example, threads 113*a* engage with a second connecting region 113*b* on the core sleeve 112, for example, threads 113*b*. In an embodiment, tightening the threads 113*a*, 113*b* results in the medium applicator 106, 206 protruding out of the first end 103 of the barrel 102. In other embodiments the connecting regions 113*a* and 113*b* are two sides of a snap fit, a bayonet tab and sleeve connection, a press fit, or other connection that when connected results in the medium applicator 106, 206 protruding out of the first end 103 of the barrel 102.

Still referring to FIG. 5, the first portion 102*a* of the barrel is securely attached to the second portion 102*b* via cooperating first and second barrel connecting regions 111*a* and 111*b*. In an embodiment, for example, the first and second barrel connecting regions 111*a* and 111*b* are threads 111*a* and 111*b*, and the threads are tightened to produce a secure attachment. In other embodiments, the first and second barrel connecting regions 111*a* and 111*b* are two sides of a snap fit, a bayonet tab and sleeve connection, a press fit, or other connection that when connected results in the secure attachment of the first and second portions 102*a*, 102*b* of the barrel 102. In an assembled configuration, which is illustrated in FIGS. 1 and 2, the medium holder 104 is securely fixed in place within the barrel 102 with the medium applicator 106, 206 protruding from the barrel 102 and the magnetic core 105 securely fixed proximate to the medium applicator 106, 206.

Figure 6:
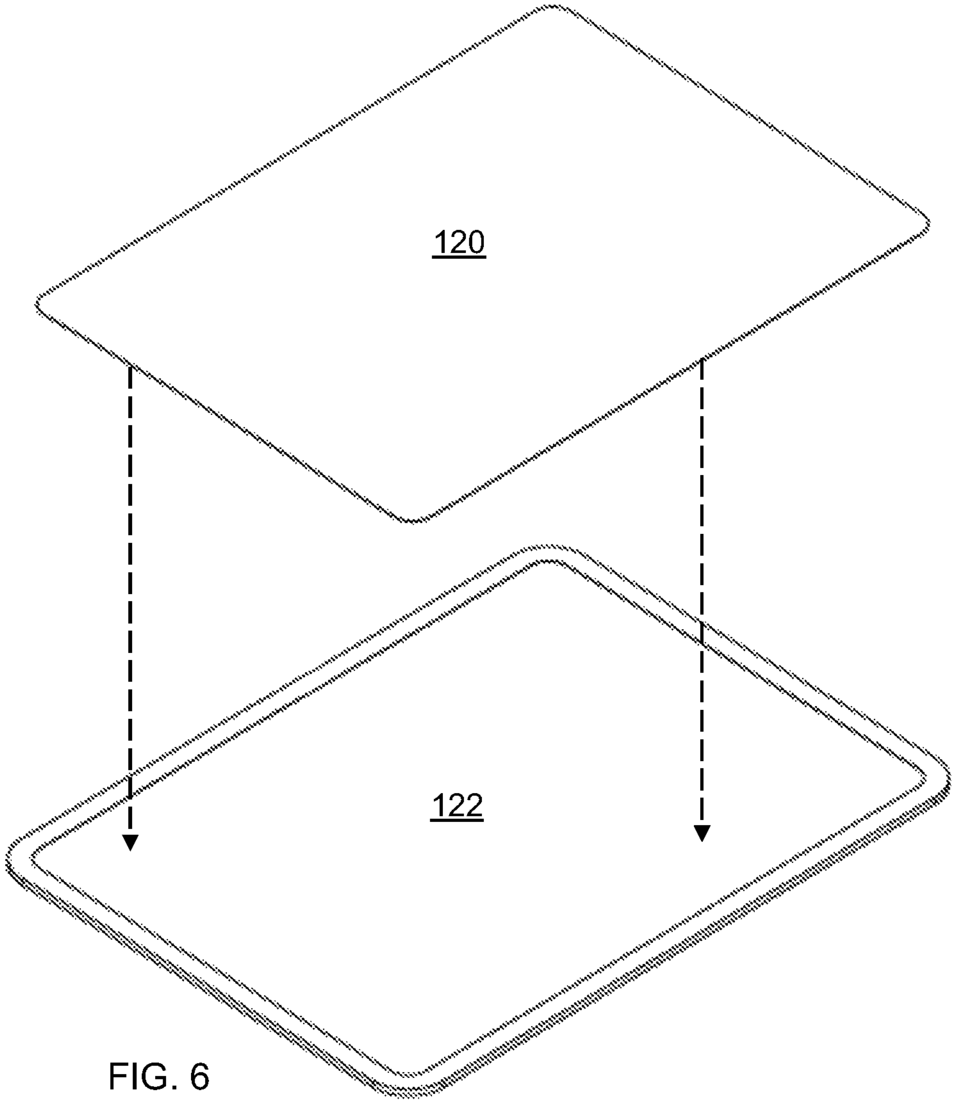
FIG. 6 illustrates an exploded view of a magnetic supporting surface according to an embodiment.

Referring to FIG. 6, in an embodiment a writing system including the writing tool 100 further comprises a magnetic supporting surface 120 adapted to support a writing surface, for example, a piece of paper, wherein the magnetic supporting surface 120 comprises magnetic or ferromagnetic materials. In an embodiment, the magnetic supporting surface 120 is a sheet of magnetic or ferromagnetic material 120, for example without limitation, a sheet of galvanized steel 120. In an embodiment the magnetic support surface 120 comprises a sheet of magnetic or ferromagnetic material 120 securely fixed on a hardboard backing 122. In an embodiment the magnetic support surface includes, for example without limitation, a 220 mm×300 mm sheet of magnetic or ferromagnetic material 120 securely fixed on a 240 mm×320 mm hardboard backing.

In an embodiment, corners of the magnetic supporting surface 120 have, for example without limitation, about a 10 mm radius, and the magnetic supporting surface 120 has a thickness, for example without limitation, of about 0.3 mm. In an embodiment the hardboard backing 122 has a thickness, for example without limitation, of about 3.2 mm. In an embodiment, in order to embed the magnetic supporting surface 120 within the hardboard backing 122, the hardboard backing 122 is carved into at a depth of about 0.3 mm. Then, once a hollow rectangle is carved into the hardboard backing 122, the magnetic supporting surface 120 is embedded within the hardboard backing 122, and secured with, for example without limitation, a two-part epoxy glue. The hardboard backing 122 provides sturdy, portable and lightweight backing while the magnetic supporting surface 120 is layered on top providing ferromagnetic properties. In other embodiments the magnetic supporting surface 120 and/or the hardboard backing 122 can have different height, width, depth, and corner radius dimensions, and can further be attached via fasteners or other mean of attachment as are known in the art.

In an embodiment the magnetic core 105 is adapted to be attracted to the magnetic support surface 120 further adapted to support a writing surface, for example without limitation a piece of paper, cardboard, canvas, cloth, or other material that can receive the liquid writing medium from the medium applicator 106, 206. In an embodiment the force of attraction between the magnetic core 105 and the magnetic support surface 120 maintains contact between the medium applicator 106, 206 and the writing surface. In an embodiment the force of attraction between the magnetic core 105 and the magnetic support surface 120 assists in establishing contact between the medium applicator 106, 206 and the writing surface.

Figure 7:
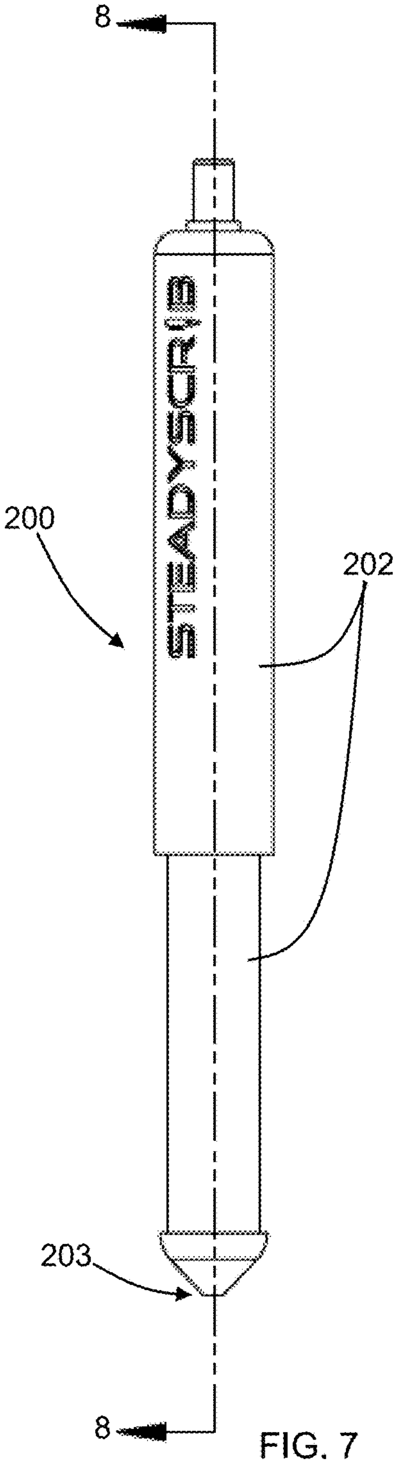
FIG. 7 illustrates a side view of an exemplary writing tool according to another embodiment.
Figure 8:
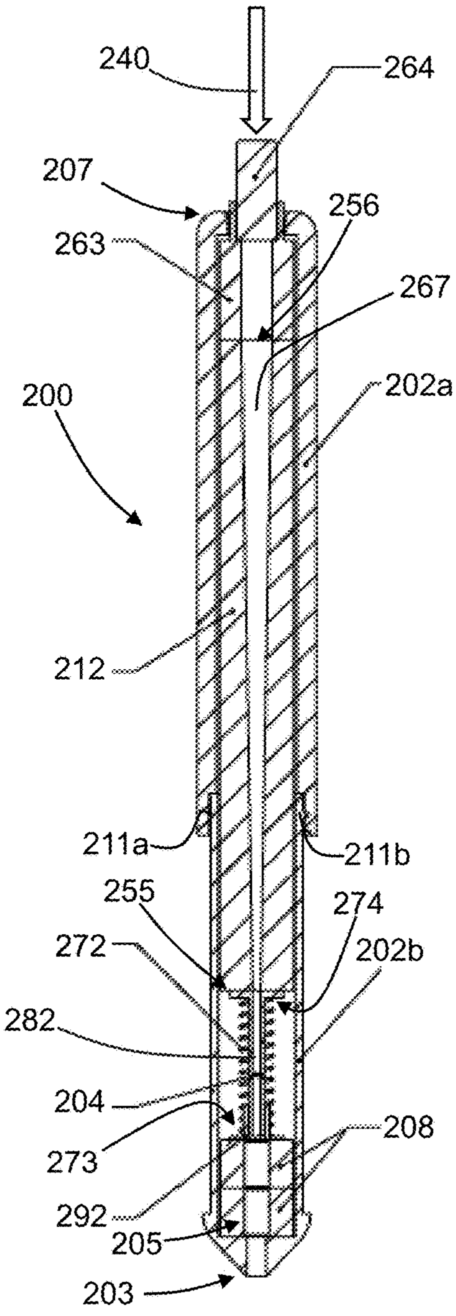
FIG. 8 illustrates a cross-sectional view of the exemplary writing tool of FIG. 7 taken generally along the lines 8-8 of FIG. 7.

Thus far the writing tool 100 has been described to be include a medium holder 104 that can be any sort of structure that is comprised of or holds a liquid writing medium, for example without limitation, marker ink, conventional ink, paint, or any other liquid writing medium. Referring now to FIGS. 7 and 8, in another embodiment a writing tool 200, for example, a mechanical lead, chalk, or crayon pencil 200, comprises a barrel 202 having a first end 203 and a second end 207. However, in this embodiment a medium holder 204 has a structure adapted to securely hold onto rods of solid media 298 for example without limitation, lead, chalk, or crayon. Before describing differences between the writing tool 200 and the writing tool 100 it should be noted that many of the components are the same.

For example, in an embodiment a magnetic core 205 is disposed within the barrel 202 proximate to the first end 203 of the barrel 202. In an embodiment the magnetic core 205 comprises at least one magnet 208. In an embodiment the magnetic core 205 comprises two magnets 208. In other embodiments the magnetic core 205 comprises more than two magnets 208. In an embodiment the two magnets 208 are stacked ring neodymium magnets, wherein an end of the stack is positioned about 5 mm above the end 203 of the writing tool 200. In an embodiment, the magnet or magnets 208 are generally cylindrical and have a passage disposed therethrough as illustrated in FIG. 4.

Still referring to FIGS. 7 and 8, in an embodiment the barrel 202 comprises a first portion 202*a* and a second portion 202*b*, wherein the first and second portions 202*a* and 202*b* detachably attach in all of the same ways as the first and second portions 102*a* and 102*b* described above for the writing tool 100. In an embodiment the writing tool 200 further comprises a core sleeve 212 having a first end 255 and a second end 256. In an embodiment the core sleeve 212 includes a central lumen 267 that can be used to store rods of solid media. In an embodiment the central lumen 267 is tapered to allow for easy loading of the rods of solid media while guiding each rod to the medium holder 204.

In an embodiment, an advancement button 263 is disposed extending from the second end 207 of the barrel 202. The advancement button 263 is adapted to have a longitudinal motion, that is up and down in FIG. 8, relative to the barrel 202. In use, the advancement button is forced against the bias of the spring 272 to advance solid medium out of the barrel 202. In an embodiment, an eraser 264 is disposed in an end of the advancement button 263. When actuating the advancement button 263, the eraser 264 can be first removed or left in place.

Figure 9:
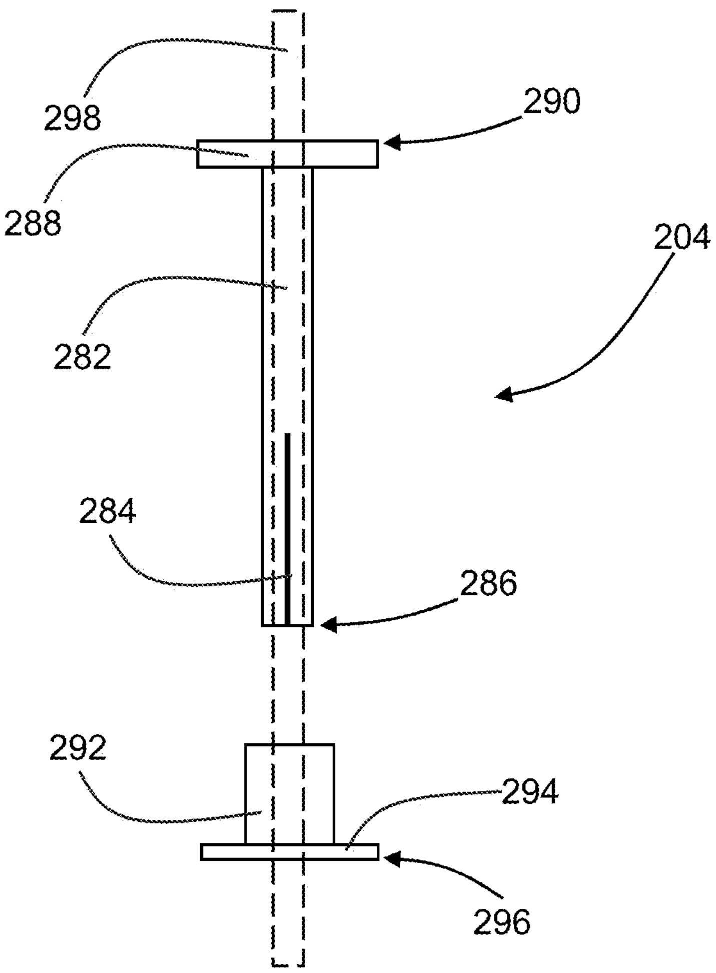
FIG. 9 illustrates a disassembled medium holder according to an embodiment.

Referring to FIG. 8, in an embodiment the medium holder 204 is disposed between the first end 255 of the core sleeve 212 and the magnetic core 205. In an embodiment a spring 272 is disposed around the medium holder 204 so that first and second ends 273, 274 of the medium holder 204 are biased apart by the spring 272. Referring to FIG. 9, in an embodiment the medium holder 204 (shown disassembled for clarity) comprises an assembly of a dispenser tube 282 and a clamping ring 292.

In an embodiment the dispenser tube 282 includes a split circumferential wall 284 at a first end 286 and a first flange 288 at a second end 290. The dispenser tube 282 is assembled to a clamping ring 292 that slides over the first end 286 of the dispenser tube. The clamping ring 292 has a second flange 294 at a first end 296. In an embodiment the medium holder 204 securely holds a solid writing medium 298, for example without limitation, a rod of lead, crayon, chalk or other solid writing medium 298 as is known in the art, that is disposed through the medium holder 204. In an embodiment the clamping ring 292 is sized so that when disposed over the first end 286 of the dispenser tube 282 the clamping ring 292 compresses the split circumferential wall 284 of the dispenser tube 282. If there is a piece of the solid writing medium 298 (shown as the dashed rod 298 in FIG. 9) present within the dispenser tube 282, then the clamping ring 292 compresses the split circumferential wall 284 onto the solid writing medium 298, which securely holds the solid writing medium 298 relative to the dispenser tube 282.

Still referring to FIGS. 8 and 9, in an embodiment a force 240, as shown by the arrow 240, applied on the advancement button 263 toward the barrel 202 pushes the dispenser tube 282 and the solid writing medium 298 securely held therein through the clamping ring 292 toward the first end 203 of the barrel 202. When the first end 286 of the dispenser tube 282 is pushed through the clamping ring 292, the split circumferential walls expand 284. Expansion of the circumferential walls 284 temporarily unsecures the writing medium 298 from the dispenser tube 282, so that when the force 240 on the advancement button 263 is released, bias of the spring 272 pushes the dispenser tube 282 back away from the first end 203 of the barrel 202 until the clamping ring 292 again compresses the split circumferential wall 284 of the dispenser tube 282 onto the solid writing medium 298. Repeating the process of applying a force 240 to the advancement button 263 advances the solid writing medium 298 toward and out of the end 203 of the barrel 202.

In an embodiment the magnetic core 205 is adapted to be attracted to the magnetic support surface 120 further adapted to support a writing surface, for example without limitation a piece of paper, cardboard, canvas, cloth, or other material that can receive the solid writing medium 298. In an embodiment the force of attraction between the magnetic core 205 and the magnetic support surface 120 maintains contact between the solid writing medium 298 and the writing surface. In an embodiment the force of attraction between the magnetic core 205 and the magnetic support surface 120 assists in establishing contact between the solid writing medium 298 and the writing surface.

In an embodiment the writing tool 200 is assembled by following connections similar to those shown between the components illustrated in FIG. 5 for the writing tool 100. The difference in assembly is that for the writing tool 200 after placement of the magnetic core 205, and before placement of the core sleeve 212, the assembled medium holder 204 is placed inside the barrel 202. After placement of the medium holder 204, in an embodiment the core sleeve 112 is placed into the second portion 102*b* so that the first end 255 of the core sleeve 212 contacts the medium holder 204.

In an embodiment the advancement button 263 is placed onto the core sleeve 112, and the first portion 202*a* of the barrel is securely attached to the second portion 202*b* via cooperating first and second barrel connecting regions 211*a* and 211*b*. In an embodiment, for example, the first and second barrel connecting regions 211*a* and 211*b* are threads 211*a* and 211*b*, and the threads are tightened to produce a secure attachment. In other embodiments, the first and second barrel connecting regions 211*a* and 211*b* are two sides of a snap fit, a bayonet tab and sleeve connection, a press fit, or other connection that when connected results in the secure attachment of the first and second portions 202*a*, 202*b* of the barrel 202. In an embodiment an eraser 264 can be press fit into the advancement button 263 of so desired.

Figure 10:
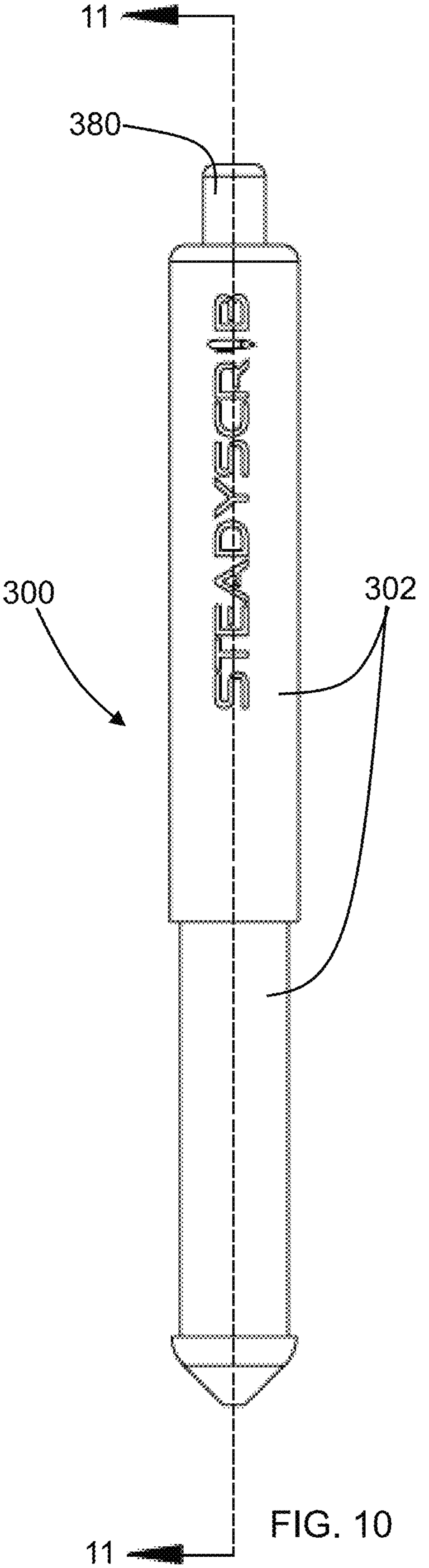
FIG. 10 illustrates a side view of an exemplary writing tool according to a further embodiment.
Figure 11:
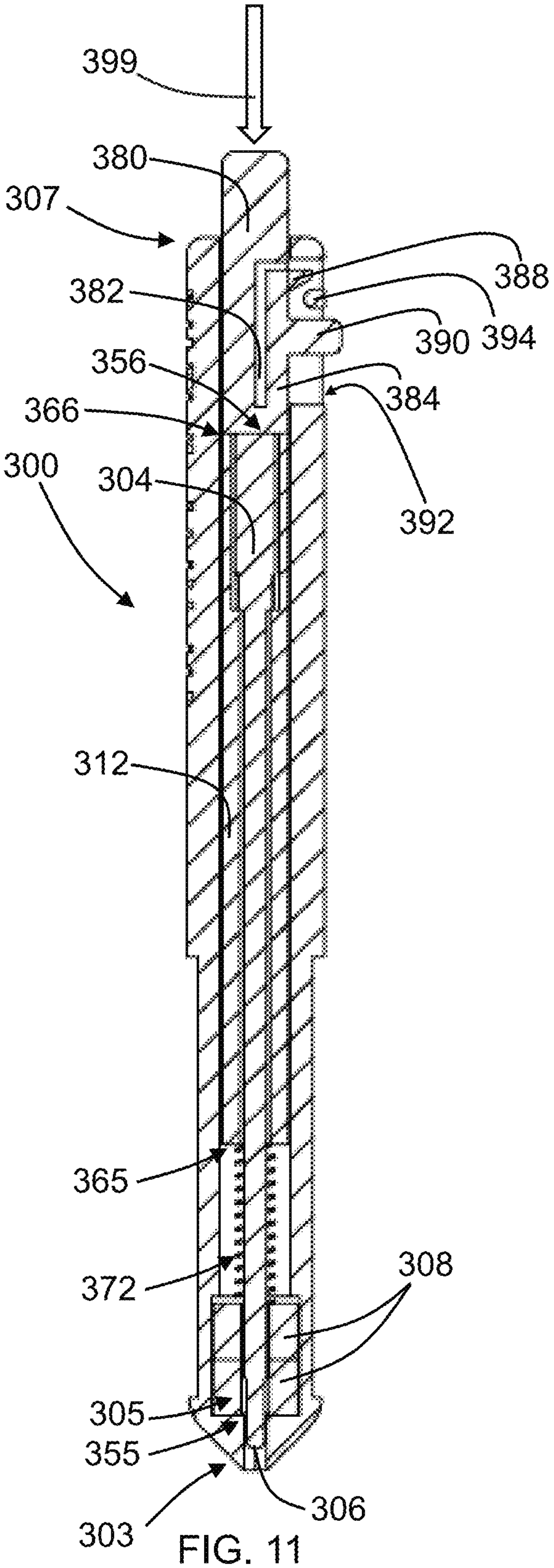
FIG. 11 illustrates a cross-sectional view of the exemplary writing tool of FIG. 10 taken generally along the lines 11-11 of FIG. 10.

Referring to FIGS. 10 and 11, in another embodiment a writing tool 300 is similar to the writing tool 100 in having a medium holder 304 that can be any sort of structure that is comprised of or holds a liquid writing medium. However, the writing tool 300 differs from the writing tool 100 in that it further includes additional features not present in the writing tool 100. Before describing differences between the writing tool 300 and the writing tool 100 it should be noted that many of the components are the same. For example, the embodiment of a writing tool 300 comprises a barrel 302 having a first end 303 and a second end 307, a medium holder 304, for example an ink fill 304 disposed within the barrel 302, the medium holder 304 having a first end 355 and a second end 356. In an embodiment the first end 355 of the medium holder 304 is adapted to support a medium applicator 306 to protrude from the first end 303 of the barrel 302. In FIG. 11 the medium applicator 306 is shown retracted within the first end 303.

In an embodiment a magnetic core 305 is disposed within the barrel 302 proximate to the first end 303 of the barrel 302. In an embodiment the magnetic core 305 comprises at least one magnet 308. In an embodiment the magnetic core 305 comprises two magnets 308. In other embodiments the magnetic core 305 comprises more than two magnets 308. In an embodiment the two magnets 308 are stacked ring neodymium magnets, wherein an end of the stack is positioned about 5 mm above the end 303 of the writing tool 300. In an embodiment, the magnet or magnets 308 are generally cylindrical and have a passage disposed therethrough as illustrated in FIG. 4. In an embodiment the magnetic core 305, for example comprising one, or two, or more magnets as illustrated in FIG. 4, is disposed around the medium holder 304. In an embodiment the medium holder 304 is an ink fill 304, and the medium applicator 306 is a ballpoint writing nib 306, which writes like a conventional pen and provides a user a writing experience that is indistinguishable from a conventional pen.

In an embodiment, the writing tool 300 shown in FIGS. 10 and 11 utilizes ink as a writing medium so that the medium holder 304 is an ink fill 304 having a medium applicator 306 that is a writing nib 306. In another embodiment, the writing tool 300 is a marker wherein the medium holder 304 is a reservoir or ink fill 304 for holding the marker ink and the medium applicator 306 is for example, a felt or sponge tip 306 or other tip structure as is known in the art for markers or paint, and wherein a felt body or other structure extends between the felt or sponge tip 306 and the reservoir 304 thereby providing a path for the marker ink to be drawn toward the felt or sponge tip 306, for example by wicking or capillary action. In other embodiments, the medium holder 304 can be any sort of structure that is comprised of or holds a liquid writing medium, for example without limitation, marker ink, conventional ink, paint, or any other liquid writing medium.

Figure 12:
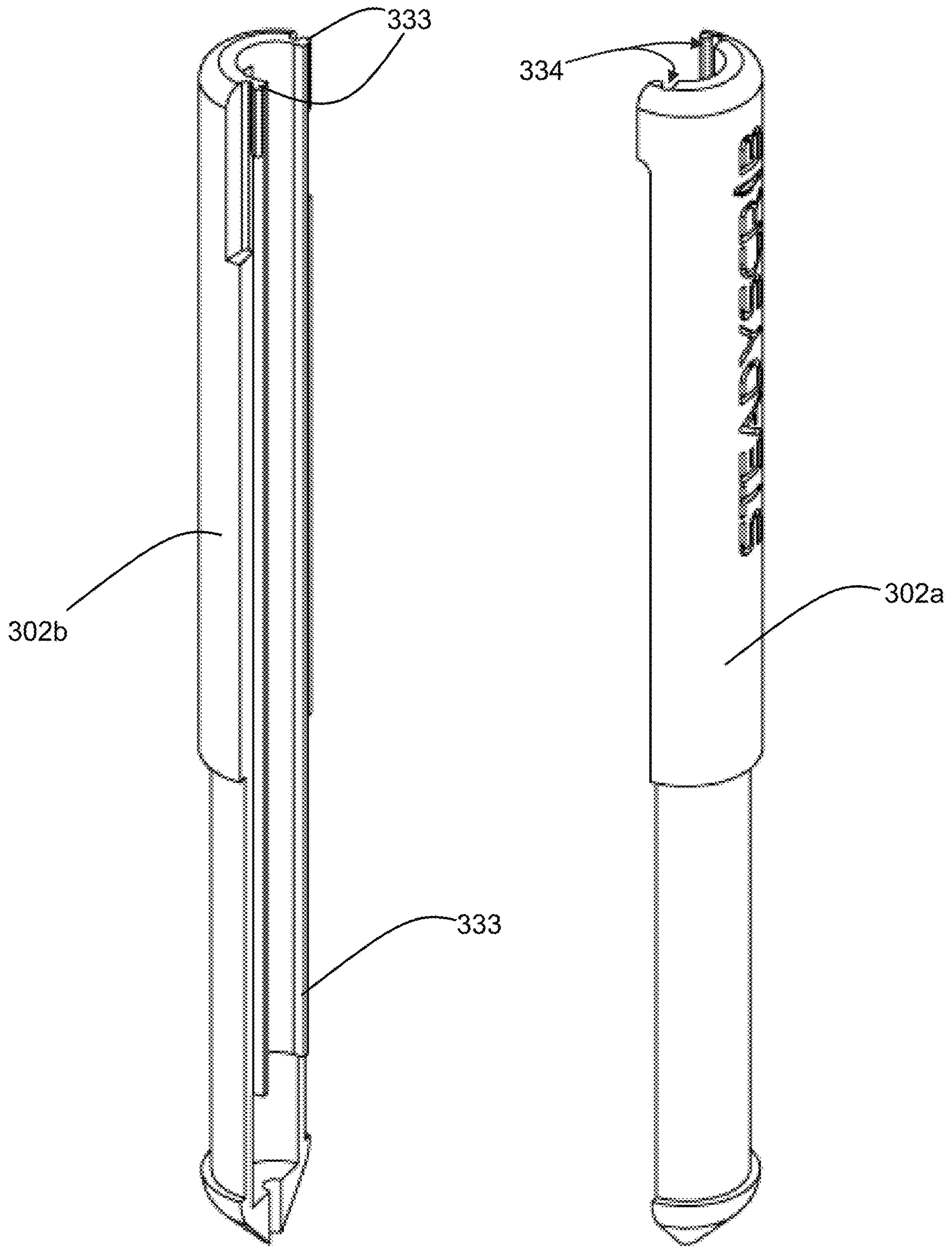
FIG. 12 illustrates a disassembled view of an exemplary barrel for an exemplary writing tool according to an embodiment.

Referring to FIGS. 10-12, in an embodiment the barrel 302 comprises a first portion 302*a* and a second portion 302*b*, wherein the first and second portions 302*a* and 302*b* detachably attach, for example without limitation, via a snap fit, or by other mechanisms of attachment as are known in the art. For example, in an embodiment, raised edges 333 extending from one of the first or second portion 302*a*, 302*b*, snap into grooves (indicated by the arrow 334) on the other of the first or second portion 302*a*, 302*b*.

Referring to FIG. 11, in an embodiment the writing system 300 further comprises a core sleeve 312 disposed within the barrel 302 and having a first end 365 and a second end 366, wherein the medium holder 304 is disposed through the core sleeve 312. In an embodiment, the medium holder 304 detachably attaches to the core sleeve 312 in the same way that the medium holder 104 attaches to the core sleeve 112 as described hereinabove for the writing tool 100. In an embodiment a spring 372 is disposed around the medium holder 304 and between the first end 365 of the core sleeve 312 and the magnetic core 305. In an embodiment a clicking mechanism 380 is disposed extending from the second end 307 of the barrel 302 and adapted to have first and second indexed positions relative to the barrel 302 as is described more fully hereinbelow. In an embodiment the medium holder 304 is disposed through the core sleeve 312 so that the second ends 356, 366 of the medium holder 304 and the core sleeve 312 are biased by the spring 372 against the clicking mechanism 380.

Figure 13:
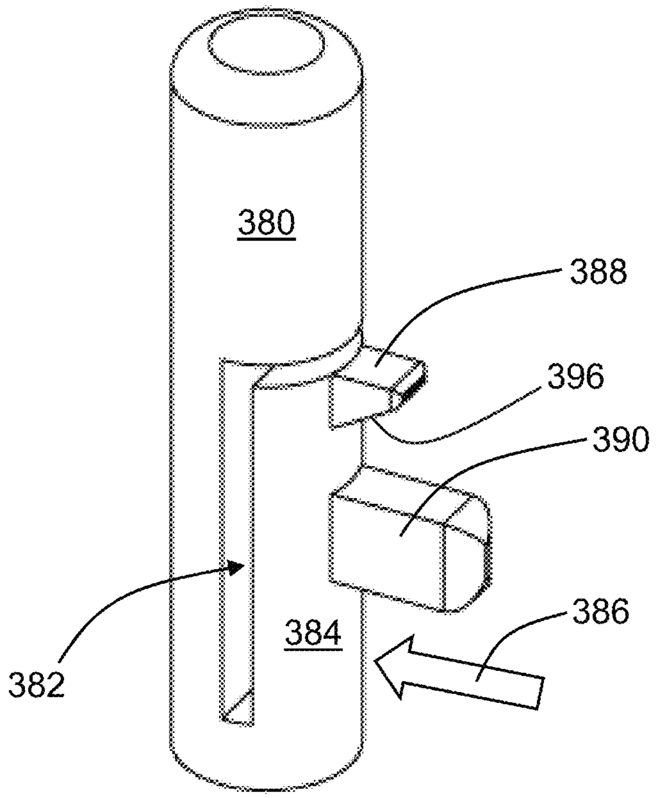
FIG. 13 illustrates an exemplary clicking mechanism for an exemplary writing tool according to an embodiment.

Referring now to FIGS. 11 and 13, in an embodiment the clicking mechanism 380 has a structure including slot 382 that allows an actuation arm 384 to be compressed radially as shown by the arrow 386. In an embodiment the clicking mechanism 380 further comprises a locking tab 388, and a release button 390, and the barrel 302 includes a hole or slot 392 and a catch 394. In an embodiment the locking tab 388 has an angled or curved bottom edge 396 (see FIG. 13). During assembly the clicking mechanism 380 is placed into the one or other portions 302*a* or 302*b* of the barrel 302 so that the release button 390 extends through the hole or slot 392.

In an embodiment, when assembled into the writing tool 300 the clicking mechanism 380 has first and second indexed positions relative to the barrel 302 that correspond to first and second configurations for the writing tool 300, respectively. For example, in a first configuration the clicking mechanism 380 is disposed in the first indexed position relative to the barrel 302 as shown in FIG. 11, the spring 372 is in a first compressed state, and the medium applicator 306 is disposed within the first end 303 of the barrel 302. In use, to get from the first configuration to the second configuration, and thereby extend the medium applicator 306 for writing, a force 399, as illustrated by the arrow 399, is applied on the clicking mechanism 380 toward the barrel 302. Because of the slot 382 that allows the actuation arm 384 to move radially, in response to the force 399 the bottom edge 396 (see FIG. 13) of the locking tab 388 contacts and slides radially inwardly and longitudinally past the catch 394. Upon sliding longitudinally past the catch 394 the locking tab 388 pops radially outwardly and is trapped under the catch 394 by the bias of the spring 372 in a second indexed position.

When the locking tab 388 is trapped as described above, the writing tool 300 is in the second configuration wherein the clicking mechanism 380 is disposed in the second indexed position, the spring 372 is in a second compressed state that is more compressed than the first compressed state, and the medium applicator 306 is protruding from the first end 303 of the barrel 302. The second configuration is easily visualized based on the illustration of the writing tool 300 shown in the first configuration in FIG. 11.

To return the writing tool 300 back to the first configuration with the medium applicator 306 retracted within the body 302, a radial force is applied to the release button 390 in the direction shown by the arrow 386. As a result of the force along arrow 386 the locking tab 388 deflects radially inward sufficiently far enough so that the bias of the spring 372 pushes the locking tab 388 beyond the catch 394 and returns the writing tool 300 to the first configuration with the clicking mechanism 380 in the first indexed position. Referring to FIGS. 11 and 12, in an embodiment the writing tool or pen 300 is assembled by arranging the components as shown in FIG. 11 into one side 302*a*, 302*b* of the barrel 302, and then attaching the other side 302*a* or 302*b* onto the one side 302*a*, 302*b*.

In an embodiment the magnetic core 305 is adapted to be attracted to the magnetic support surface 120 further adapted to support a writing surface, for example without limitation a piece of paper, cardboard, canvas, cloth, or other material that can receive the liquid writing medium from the medium applicator 306. In an embodiment the force of attraction between the magnetic core 305 and the magnetic support surface 120 maintains contact between the medium applicator 306 and the writing surface. In an embodiment the force of attraction between the magnetic core 305 and the magnetic support surface 120 assists in establishing contact between the medium applicator 306 and the writing surface.

In any of the embodiments described herein the writing tool 100, 200, 300 is approximately the same length as a standard conventional pen, but is made wider to accommodate for rigidity. In an embodiment the barrel 102, 202, 302 has a length in a range from about 110 to about 160 mm in length, and a width in a range from about 15 to about 50 mm in width at its widest point. In an embodiment the medium holder 104, 204 has a length in a range from about 85 to about 115 mm in length.

Figure 3:
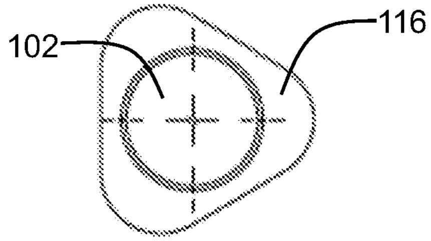
FIG. 3 illustrates a top plan view of the exemplary writing tool according to an embodiment.

In any of the embodiments the body of the writing tool 100, 200, 300 and the cap 119 is, for example without limitation, three dimensionally (3D) printed using a Polylactic Acid (PLA) filament. In other embodiments the writing tool 100, 200, 300 and the cap 119 is manufactured from other materials using other methods as are known in the art. Referring to FIGS. 1-3 but applicable to any embodiment disclosed herein, the writing tool 100, 200, 300 further comprises a flexible grip 116, for example without limitation, a wide silicone grip 116, disposed around the barrel 102, 202, 302. As can be seen in FIGS. 1 and 3, in an embodiment the flexible grip 116 has an uneven radius and can extend from the barrel 102, 202, 302 by a varying distance around the barrel 102, 202, 302. Without being held to theory, it is believed that this designed non-symmetry combined with the flexibility of the flexible grip 116 makes it easier for a user to grip and write with the writing tool 102, 202, 302. In an embodiment the flexible grip 116 is made from silicone, for example without limitation, that is produced from a mold that is filled with liquid silicone solution. In an embodiment the mold is designed using computer aided design (CAD) tools, and subsequently 3D printed.

Materials used for one or more components of embodiments disclosed herein include, for example without limitation, thermoplastic polyurethane, silicone, plastic, wood, resin, foam, metal, or rubberized material. For example without limitation, the medium holder 104, 204, 304 and the flexible grip 116 can be made from any material selected from the group including thermoplastic polyurethane, silicone, or otherwise rubberized or foam materials. For example without limitation, the barrel 102, 202, 302 can be made from any material selected from the group including plastic, resin, or metal. For example without limitation, the hardboard backing 122 can be made from plastic or wood. In other embodiments, the sizes and noted shapes for components can be other than what has been described hereinabove.

INDUSTRIAL APPLICABILITY

A writing system comprises a writing tool including a magnetic core that directs a magnetic force of attraction along a medium applicator to assist users having difficulties with writing due to Parkinson's and other diseases. The magnetic force attracts the writing tool to a magnetic support surface to stabilize the writing tool, thereby making it easier to write for the user. The writing tool can use liquid ink or a solid writing medium of any sort as desired. The writing system can be manufactured by industry and used by consumers.

Numerous modifications to the present invention will be apparent to those skilled in the art in view of the foregoing description. It is not desired to limit the invention to the exact construction and operation shown and described, and accordingly, all suitable modifications and equivalents may be resorted to, falling within the scope of the invention. Accordingly, this description is to be construed as illustrative only of the principles of the invention and is presented for the purpose of enabling those skilled in the art to make and use the invention and to teach the best mode of carrying out same. The exclusive rights to all modifications which come within the scope of the appended claims are reserved. All patents, patent publications and applications, and other references cited herein are incorporated by reference herein in their entirety.

What is claimed is:

1. A writing system, comprising:
a writing tool comprising:
a barrel having a first end and a second end;
a medium holder having a first end and a second end, the medium holder disposed within the barrel, wherein the medium holder is adapted to support a medium applicator to protrude from the first end of the barrel; and
a magnetic core disposed within the barrel proximate to the first end of the barrel; and
a magnetic supporting surface adapted to support a writing surface, wherein the magnetic supporting surface comprises magnetic or ferromagnetic materials, and wherein the magnetic core is adapted to be attracted to the magnetic surface.

2. The writing system of claim 1, further comprising:
a core sleeve disposed within the barrel and having a first end and a second end;
a spring disposed around the medium holder and between the first end of the core sleeve and the magnetic core; and
a clicking mechanism disposed extending from the second end of the barrel and adapted to have first and second indexed positions relative to the barrel;
wherein the medium holder is disposed through the core sleeve so that the second ends of the medium holder and the core sleeve are biased by the spring against the clicking mechanism.

3. The writing system of claim 2, further comprising the medium applicator, wherein
in a first configuration the clicking mechanism is disposed in the first indexed position, the spring is in a first compressed state, and the medium applicator is disposed within the first end of the barrel; and
in a second configuration the clicking mechanism is disposed in the second indexed position, the spring is in a second compressed state that is more compressed than the first compressed state, and the medium applicator is protruding from the first end of the barrel.

4. The writing system of claim 1, further comprising:
the medium applicator protruding from the first end of the barrel.

5. The writing system of claim 1, further comprising:
a core sleeve disposed within the barrel and having a first end and a second end;
an advancement button disposed extending from the second end of the barrel and adapted to have a longitudinal motion relative to the barrel;
wherein the medium holder is disposed between the first end of the core sleeve and the magnetic core; and
a spring is disposed around the medium holder so that first and second ends of the medium holder are biased apart by the spring.

6. The writing system of claim 5,
wherein the medium holder comprises an assembly of a dispenser tube having a split circumferential wall at a first end and a first flange at a second end, the dispenser tube assembled to a clamping ring having a second flange at a first end, wherein
in a first configuration, the clamping ring compresses the split circumferential wall of the dispenser tube so that the dispenser tube is adapted to securely clamp onto the medium applicator, and wherein
in a second configuration, in response to a force applied to the advancement button toward the barrel, the dispenser tube is pushed through the clamping ring toward the first end of the barrel so that the split circumferential walls expand radially, and
upon release of the force to the advancement button, bias of the spring pushes the dispenser tube back away from the first end of the barrel until the clamping ring again compresses the split circumferential wall of the dispenser tube, thereby returning the writing system to the first configuration.

7. The writing system of claim 1, further comprising a flexible grip disposed around the barrel.

8. A writing system, comprising:
a writing tool comprising:
a barrel having a first end and a second end;
a core sleeve disposed within the barrel and having a first end and a second end;
a medium holder having a first end and a second end, the medium holder disposed through the core sleeve, wherein the first end of the medium holder supports a medium applicator; and
a magnetic core disposed within the barrel proximate to the first end of the barrel; and
a magnetic supporting surface adapted to support a writing surface, wherein the magnetic supporting surface comprises magnetic or ferromagnetic materials, and wherein the magnetic core is adapted to be attracted to the magnetic surface.

9. The writing system of claim 8, further comprising:
a spring disposed around the medium holder and between the first end of the core sleeve and the magnetic core; and
a clicking mechanism disposed extending from the second end of the barrel and adapted to have first and second indexed positions relative to the barrel; wherein
the second ends of the medium holder and the core sleeve are biased by the spring against the clicking mechanism.

10. The writing system of claim 8, wherein the magnetic core comprises at least one magnet, and the magnetic core is disposed around the medium holder.

11. The writing system of claim 8, wherein the barrel comprises first and second portions that securely attach.

12. The writing system of claim 8, further comprising a flexible grip disposed around the barrel.

* * * * *